(12) United States Patent
Matsumori et al.

(10) Patent No.: US 10,129,929 B2
(45) Date of Patent: Nov. 13, 2018

(54) ANTENNAS CONFIGURED FOR SELF-LEARNING ALGORITHMS AND RELATED METHODS

(75) Inventors: Barry Matsumori, La Jolla, CA (US); Laurent Desclos, San Diego, CA (US); Sebastian Rowson, San Diego, CA (US); Jeffrey Shamblin, San Marcos, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 13/557,176

(22) Filed: Jul. 24, 2012

(65) Prior Publication Data

US 2013/0109327 A1 May 2, 2013

Related U.S. Application Data

(60) Provisional application No. 61/511,107, filed on Jul. 24, 2011.

(51) Int. Cl.
*H04W 88/06* (2009.01)
*H04W 24/02* (2009.01)

(52) U.S. Cl.
CPC ........... *H04W 88/06* (2013.01); *H04W 24/02* (2013.01)

(58) Field of Classification Search
USPC .......................................... 455/73, 78, 552.1
See application file for complete search history.

(56) References Cited

U.S. PATENT DOCUMENTS

| | | | |
|---|---|---|---|
| 6,765,536 B2 | 7/2004 | Phillips et al. | |
| 6,987,493 B2 | 1/2006 | Chen | |
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,110,160 B2 * | 8/2015 | Desclos | H01Q 1/242 |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 * | 9/2016 | Zhu | H01Q 1/243 |
| 9,479,242 B2 | 10/2016 | Desclos et al. | |
| 9,590,703 B2 | 3/2017 | Desclos et al. | |
| 9,755,305 B2 | 9/2017 | Deslos et al. | |
| 9,755,580 B2 | 9/2017 | Desclos et al. | |

(Continued)

*Primary Examiner* — Nay A Maung
*Assistant Examiner* — Erica Fleming-Hall
(74) *Attorney, Agent, or Firm* — Dority & Manning, P.A.

(57) ABSTRACT

A Modal antenna system, control system, and algorithm is described which provides for improved connectivity in a communication system where statistics of previous antenna modes or beam positions for a mobile device operating in conjunction with specific base stations, access points, or other communication terminals are used to make intelligent decisions for current antenna beam state for optimal connectivity. A modal antenna is implemented to provide a variable radiation pattern for improved connectivity and an algorithm is provided that controls current beam position as the mobile device moves through a communication network.

1 Claim, 11 Drawing Sheets

(56) References Cited

U.S. PATENT DOCUMENTS

| | | | |
|---|---|---|---|
| 9,804,272 B2* | 10/2017 | Desclos | G01S 19/36 |
| 2003/0231138 A1* | 12/2003 | Weinstein | H01Q 1/38 |
| | | | 343/795 |
| 2004/0203913 A1* | 10/2004 | Ogino et al. | 455/456.1 |
| 2005/0282579 A1* | 12/2005 | Kim | 455/552.1 |
| 2006/0035636 A1* | 2/2006 | Pirila | 455/435.2 |
| 2006/0121913 A1* | 6/2006 | Lin et al. | 455/456.1 |
| 2007/0229357 A1* | 10/2007 | Zhang | H01Q 3/24 |
| | | | 343/700 MS |
| 2007/0279286 A1* | 12/2007 | Coutts | H01Q 9/0407 |
| | | | 343/700 MS |
| 2007/0296633 A1* | 12/2007 | Yanagihara | 342/463 |
| 2008/0077691 A1* | 3/2008 | Park et al. | 709/226 |
| 2008/0139136 A1* | 6/2008 | Shtrom | H01Q 3/242 |
| | | | 455/101 |
| 2008/0192681 A1* | 8/2008 | Lee et al. | 370/328 |
| 2008/0204331 A1* | 8/2008 | Shtrom | H01Q 1/241 |
| | | | 343/702 |
| 2009/0052350 A1* | 2/2009 | Chen et al. | 370/255 |
| 2009/0137206 A1* | 5/2009 | Sherman et al. | 455/41.2 |
| 2009/0180451 A1* | 7/2009 | Alpert et al. | 370/338 |
| 2009/0213819 A1* | 8/2009 | Kalhan | 370/338 |
| 2010/0195632 A1* | 8/2010 | Prabhu | 370/338 |
| 2011/0310840 A1* | 12/2011 | Kennedy et al. | 370/331 |
| 2011/0310867 A1* | 12/2011 | Kennedy et al. | 370/338 |
| 2012/0013519 A1* | 1/2012 | Hakansson | H01Q 1/243 |
| | | | 343/835 |
| 2013/0010644 A1* | 1/2013 | Chen et al. | 370/255 |
| 2013/0016696 A1* | 1/2013 | Adjakple et al. | 370/331 |
| 2013/0035111 A1* | 2/2013 | Moeglein et al. | 455/456.1 |
| 2014/0148152 A1* | 5/2014 | Periyalwar et al. | 455/426.1 |
| 2014/0242966 A1* | 8/2014 | Keating | H04W 48/04 |
| | | | 455/418 |
| 2015/0130661 A1* | 5/2015 | Desclos | G01S 19/36 |
| | | | 342/352 |

* cited by examiner

| TIME | LOCATION | BASE TERMINAL | WLAN ACCESS POINT | CELLULAR ANTENNA MODE | GPS ANTENNA MODE | WLAN ANTENNA MODE |
|---|---|---|---|---|---|---|
| 0:00:00 | LAT/LONG | BT4076 | APXXX | MODE1 | MODE1 | MODE3 |
| ... | ... | BT4317 | APXXX | MODE3 | MODE4 | MODE1 |
| ... | ... | ... | APXXX | MODE2 | MODE1 | MODE4 |
| ... | ... | ... | ... | ... | ... | ... |
| ... | ... | ... | ... | ... | ... | ... |
| ... | ... | ... | ... | ... | ... | ... |

ANTENNAS CONFIGURED FOR SELF-LEARNING ALGORITHMS AND RELATED METHODS

FIELD OF THE INVENTION

This invention relates to wireless communications; and more particularly to systems and methods for improving connectivity between one or more wireless devices and one or more network terminals within a wireless communications network.

BACKGROUND OF THE INVENTION

Wireless technologies are now prevalent in our daily activities, and present within a myriad of commercial and consumer level devices. Examples of such wireless technologies include cellular phones, multi-functional wireless devices (smart phones), personal computers, media devices, and internet dongles among others. As demand for these and other devices continues to grow, there remains a need to improve wireless communications attributes, such as but not limited to: network bandwidth capacity, connectivity, data transfer (download) speeds, and health attributes such as specific absorption rate, among others. In accordance these requirements, the field of wireless communications is continuously in need of improvements for keeping up with industry growth and consumer demands.

With the recent advent of modal antenna systems as disclosed in commonly owned U.S. Pat. No. 7,911,402, titled "ANTENNA AND METHOD FOR STEERING ANTENNA BEAM DIRECTION", and U.S. patent application Ser. No. 13/029,564, also titled "ANTENNA AND METHOD FOR STEERING ANTENNA BEAM DIRECTION", there has been provided such systems adapted for multi-mode communications, wherein each of several antenna modes provides a distinct antenna radiation pattern for steering antenna beam direction and other radiation characteristics; each of these references is hereby incorporated by reference. Accordingly, a revolution in wireless technologies will be supported by various improvements utilizing modal antenna systems for use within the aforementioned devices and associated communications networks.

Currently available antenna systems and devices associated therewith can be described within a wireless network as nomadic devices, since these devices roam about a network without a fixed pattern of movement. In practice, currently available devices can be viewed as traveling about a network through a series of incremental waypoints, for example as a wireless device user walks or drives from a first location, or waypoint, to a second. In fact, the path of a traveling user can be reduced to a series of integral waypoints about a wireless network, wherein at each waypoint the wireless device is transmitting signal to one or more network base station transceivers (BT's).

Furthermore, many devices are now capable of data acquisition across a variety of networks. For example, certain multi-function devices are capable of internet browsing and file downloads over both cellular networks (base station transceivers), and WLAN networks (access points).

It would therefore be beneficial to provide antenna systems and associated methods for improving device connectivity about a wireless network.

SUMMARY OF THE INVENTION

This application discloses systems and methods for improving wireless device connectivity about one or more network terminals within a wireless network.

For purposes of this invention, the term "network terminals" includes cellular base station transceivers, wireless local area network (WLAN) access points, global positioning system (GPS) transceivers, and other network transceivers adapted to communicate with one or more wireless devices within a wireless communications network.

In a general embodiment, a wireless device is provided having at least one modal antenna, a central processing unit (CPU), and a memory bank for storing data within one or more lookup tables therein. The modal antenna is adapted to vary one or more antenna radiation pattern characteristics, such as frequency, beam direction, power level, and the like, such that the modal antenna is configured to vary one or more radiation pattern characteristics for operation about several "antenna modes". In certain antenna mode embodiments, a single antenna radiator can be configured with one or more parasitic elements for actively shifting the antenna radiation pattern for effectuating the various modes of the antenna. Antenna pattern data relating to each mode of the modal antenna, otherwise referred to herein as "antenna mode data", is stored within the memory bank, and the CPU is adapted to process the various data for instructing the antenna to operate at a preferred mode based on a given set of data. Examples of antenna mode data include: antenna mode identification data, frequency, power (gain in dB), and specific absorption rate (SAR), among others.

Modal antenna systems can be configured to scan a network (ping nearby terminals) at a first geographical location (waypoint) to determine a number of nearby communications terminals available for possible linking. Of the available terminals, the modal antenna system can determine a preferred terminal for establishing connection based on criteria such as: link budget, data transfer speeds, proximity (distance), power level including battery considerations as well as consideration for specific absorption rate (SAR), and others. The antenna system can be further adapted to connect with the desired terminal by operating at a desired mode such that an optimum radiation pattern is configured for communicating with the preferred terminal. Furthermore, modal antenna systems can re-scan at various time intervals or physical waypoints to determine possible improvements in network connectivity. Based on availability and a need for establishing a connection with an alternative network terminal, the modal antenna system can then reconfigure the antenna mode for effectuating a "hand-off" to the second preferred terminal.

In certain embodiments, the antenna system is configured to acquire and store antenna mode data and network data for subsequent reference and antenna mode lookup. In this regard, the antenna system can be configured to lookup stored information for determining a desired terminal for establishing a communications link as well as an appropriate antenna mode for connecting with the desired terminal. Thus, in certain embodiments, a scan of nearby terminals and processing of information for determining an optimal terminal for communication can be replaced with an internal lookup of data tables within the wireless device to determine an optimal terminal for establishing communication. Using the internal lookup, a ping of several terminals and processing of link quality information can be avoided, thus providing a faster connection and reducing unnecessary load on network terminals.

In addition to information of the modal antenna (antenna mode data), the wireless device is adapted to store within the memory bank information relating to network data, including one or more of: device location data (longitude/latitude); base station transceiver (BT) location; BT identification;

WLAN access point location and identification data; link budget data; and other network information. The aforementioned network data can be pre-programmed into the wireless device, downloaded from a network server, acquired in the field (self-learned), or any combination thereof.

In certain embodiments, multiple modal antennas are provided within the wireless device, such as two or more of: a modal Cellular antenna; a modal GPS antenna; a modal WLAN antenna, or other modal antenna.

With the antenna system generally including one or more modal antennas, a CPU, and a memory bank, a method for improving connectivity across one or more wireless networks includes: providing antenna mode data stored in memory; identifying a preferred base station transceiver for establishing a connection; accessing database information using the CPU to process information from one or more lookup tables stored within the memory bank; determining an optimal antenna mode for communication with the preferred base station transceiver; and configuring the modal antenna to operate at the optimal antenna mode.

In certain embodiments, the antenna system is configured to acquire information relating to optimal antenna modes for connecting to network terminals at various waypoints, the terminals including various base station transceivers, access points, and satellites. In this regard, the antenna system is adapted to acquire in the field (self-learn) and store a record of data associated with each terminal, and an optimal antenna mode at each waypoint for communicating with the specified terminal, such that a plurality of records are stored within the device memory for relating device location and network terminal with an optimal antenna mode for optimizing communication therebetween.

Now, the device having stored information relating to various network communications terminals and optimal antenna modes, the device can be adapted to prioritize communications links. For example, a user being positioned at a first waypoint and the device capable of determining vector movement towards a second waypoint, the antenna system can be programmed to delay transmission or reception of large files at the first waypoint and execute transmission/reception at the second waypoint, where the second waypoint provides a preferred data transfer terminal, such as a WLAN terminal. In this regard, although data access can be provided across cellular BT's, the network can prioritize certain data requests for high-throughput terminals in an effort to reduce the overall load on network BT's and improve efficiency of data service across the network.

Certain algorithms for building a database of waypoints, BT's, and related network data are described herein.

DETAILED DESCRIPTION

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

In one embodiment, an antenna system within a wireless device comprises one or more modal antennas; a CPU, and a memory bank. The modal antennas can include any of: a cellular modal antenna, a GPS modal antenna, a WLAN modal antenna, or a combination thereof. The memory bank can include a memory module or other memory bank component programmed to store a database comprising a number of records. Each record of the database comprises data relating to one or more of: antenna mode identification, antenna radiation pattern data (frequency, power gain (dB), SAR, and the like), and other antenna data collectively referred to herein as "antenna mode data", and time, base station transceiver location (longitude/latitude), terminal identification data, WLAN access point identification and location data, and other wireless network data collectively referred to herein as "network data". The antenna system is further programmed with an algorithm for acquisition of certain antenna mode data and network data. Additionally, network data may be further acquired from a file download over the network.

Now turning to the figures, modern wireless devices generally comprise an antenna system with a passive antenna. The passive antenna generally provides a single radiation pattern or omni-directional radiation pattern. One limitation with devices comprising a passive antenna includes the inability to scroll through various modes for optimizing connectivity of the device with the network at each terminal. In contrast, the embodiments disclosed herein each provide a unique mechanism for optimizing connectivity over a wireless network.

Figure 1:
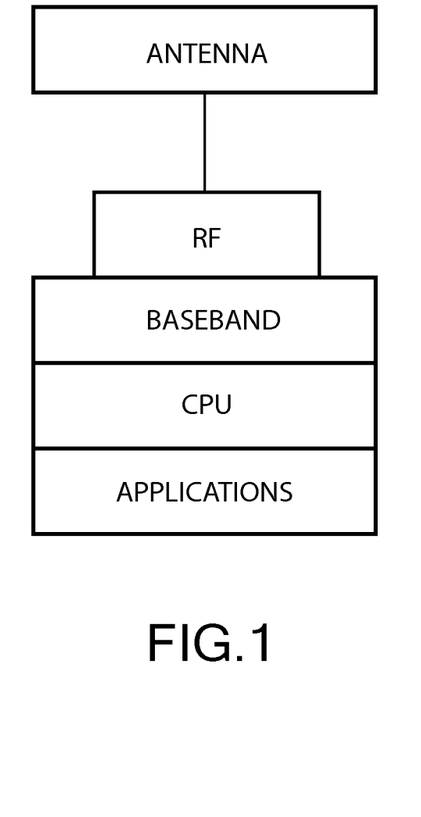
FIG. 1 illustrates a passive antenna connected to a CPU and configured to receive an RF or baseband signal during operation.

According to FIG. 1, a passive antenna can be connected to a CPU and configured to receive an RF or baseband signal during operation. The CPU is programmed to feed the antenna signal in accordance with various applications of the antenna.

Figure 2:
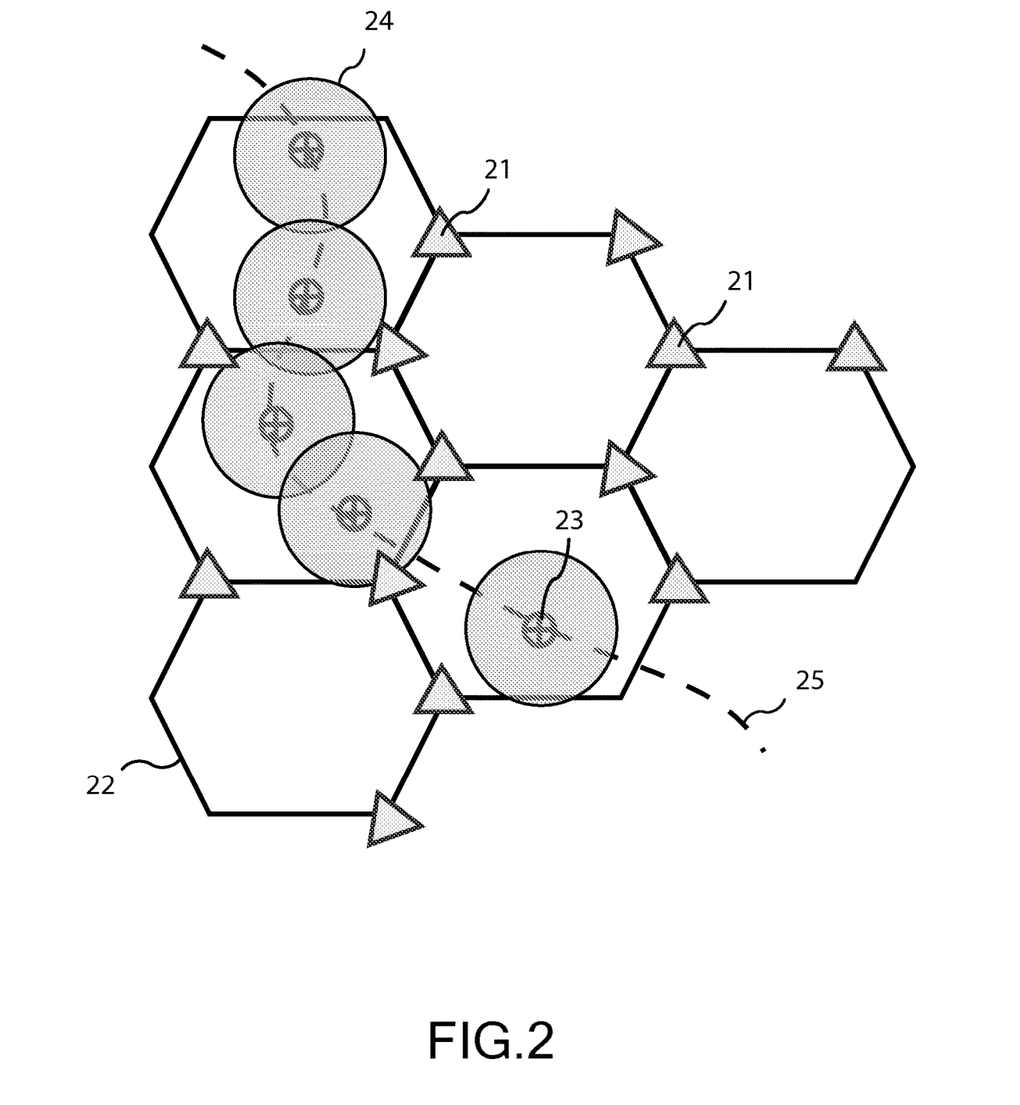
FIG. 2 illustrates a device having an omni-directional antenna moving through multiple cells 22 within a wireless network.

FIG. 2 illustrates a device having an omni-directional antenna moving through multiple cells 22 within a wireless network. The omni-directional antenna pattern 24 is represented at several waypoints 23 along the path of travel 25. At each waypoint, the omni-directional antenna is in communication with several base station transceivers (BT's) 21. Although this system is operational, there is a significant amount of power lost, and the load on the network is high.

Figure 3:
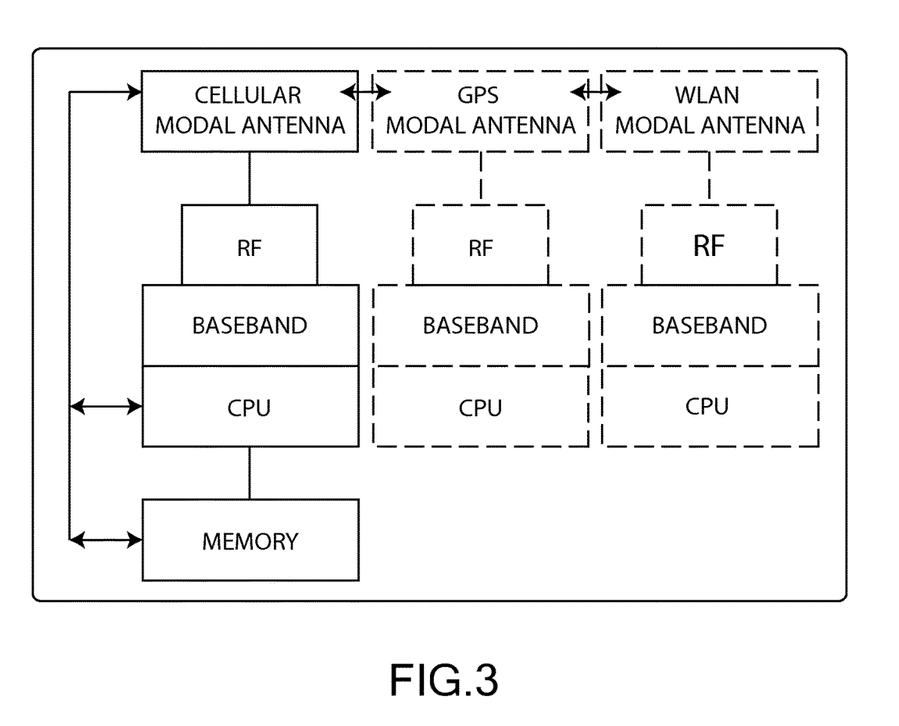
FIG. 3 illustrates a general antenna system according to various embodiments herein, the antenna system is provided for use with a wireless communications device such as a cell phone, PDA, tablet PC, laptop, or other wireless device.

FIG. 3 illustrates a general antenna system according to various embodiments herein, the antenna system is provided for use with a wireless communications device such as a cell phone, PDA, tablet PC, laptop, or other wireless device. The antenna system comprises at least one modal antenna, a CPU, and a memory bank. The at least one antenna can include one or more of: a cellular modal antenna, a GPS modal antenna, a WLAN modal antenna, or a combination thereof. The dashed lines in FIG. 3 represent optional components. The CPU sends a baseband signal to the modal antenna for effectuating a preferred operational mode of several antenna modes. Similarly, a radiofrequency (RF) signal is provided to the antenna/CPU during transmission and reception, respectively. The memory bank stores information relating to several antenna modes among other data. The CPU can further send RF signal to the transceiver, or alternatively the RF can be sent directly to the transceiver from the receiving antenna.

The memory can comprise database records relating several profiles for the purpose of selecting an optimal antenna mode for operation. The CPU is adapted to access the memory, lookup several database records and compare to network data for determining an optimal antenna mode prior to sending instructions to the antenna for configuring the modal antenna to operate according to the preferred antenna mode.

Figure 4:
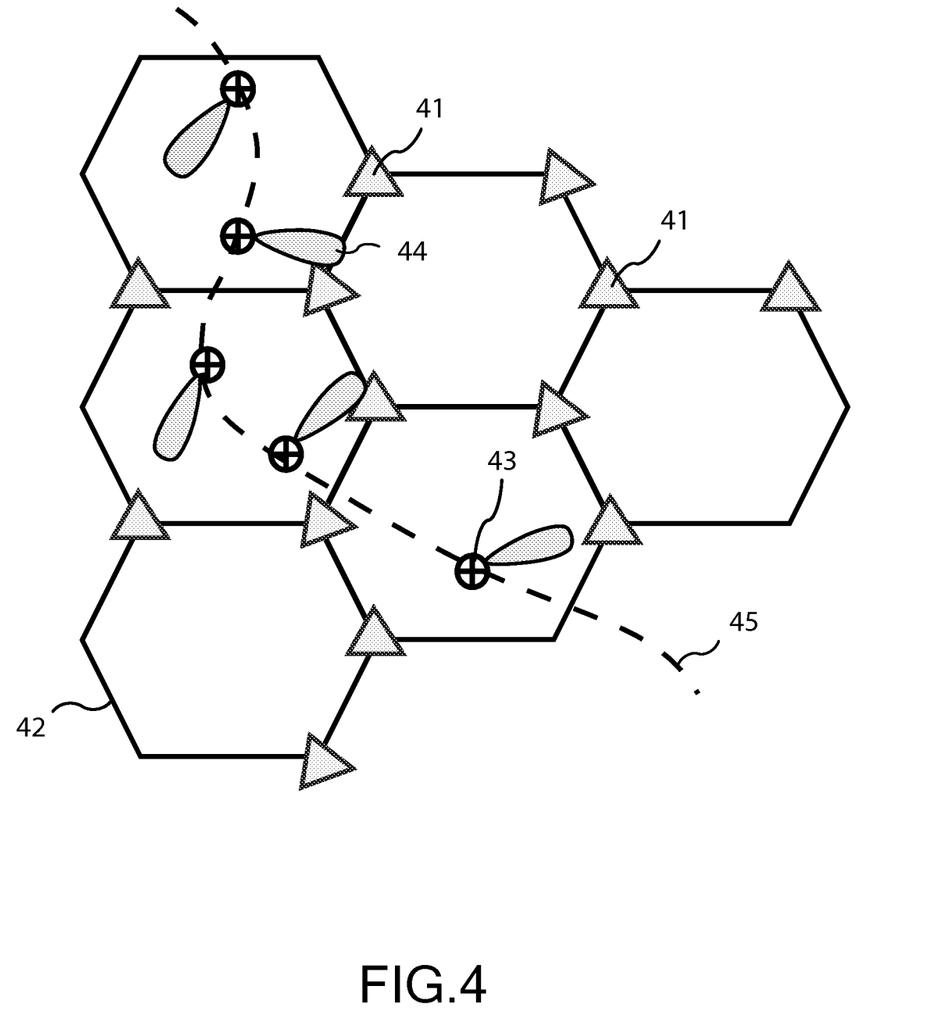
FIG. 4 illustrates a device having a modal antenna moving through multiple cells 42 within a wireless network.

FIG. 4 illustrates a device having a modal antenna moving through multiple cells 42 within a wireless network. The modal antenna pattern 44 is adapted to provide sufficient gain in the direction of a desired BT 41 for maintaining a communications signal, however power radiating away from the desired terminal can be minimized for optimizing efficiency of the antenna system. In addition, a reduced load on adjacent BT's reduces the overall network load. Thus by utilizing a modal antenna, the antenna system and network efficiency are greatly enhanced. As the mobile device travels along a path 45, the antenna system can determine an optimal terminal for communications at each waypoint 43, wherein the antenna system further configures the antenna mode for establishing communication with the desired terminal. Once the connected terminal is no longer optimum for communications, a hand-off is effectuated according to methods known in the art. Several key benefits of the network and antenna system as described in FIG. 4 include: reduced power loss about the device antenna, reduced load on the network due to the antenna system of the device, reduced SAR emissions, and improved connectivity with reduced noise.

In addition to these benefits, the antenna system is further configured to store data relating to the antenna system, and the network. Based on previously traveled routes, the antenna system can learn and store information relating to accessed BT's. In this regard, upon returning to a known waypoint, the system can configure the optimal antenna mode based on previously acquired data, or records. Here, the antenna system references position and vector information to determine nearby terminals available for communications as well as upcoming terminals according to vector anticipation. The records can be downloaded from the network, or learned by the device according to an algorithm programmed within the CPU. With modern CPU's, the lookup operations can be performed repeatedly and require only a fraction of a second to identify and effectuate an antenna mode change.

Figure 5:
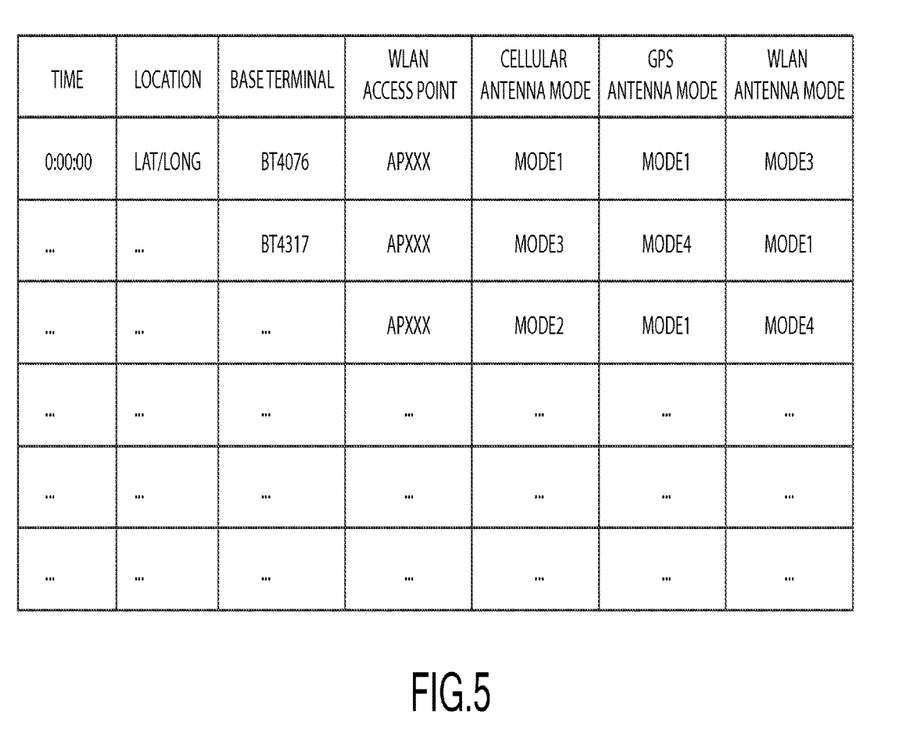
FIG. 5 represents a sample database comprising a number of records, each record including data relating to time, location in terms of longitude and latitude, base terminal identification number, WLAN access point identification number, cellular antenna mode, GPS antenna mode, and WLAN antenna mode.

FIG. 5 represents a sample database comprising a number of records, each record including data relating to time, location in terms of longitude and latitude, base terminal identification number, WLAN access point identification number, cellular antenna mode, GPS antenna mode, and WLAN antenna mode. Thus, based on a given latitude/longitude (waypoint), a local BT suitable for communications can be determined and the appropriate antenna mode for communicating with that BT is referenced. As the device approaches the known long/lat, the antenna system can be configured within the desired antenna mode for establishing a connection with the indicated BT. Thus, a survey of all local BT's and a calculation to determine the ideal BT is not required since the information is stored in the database record.

Figure 6:
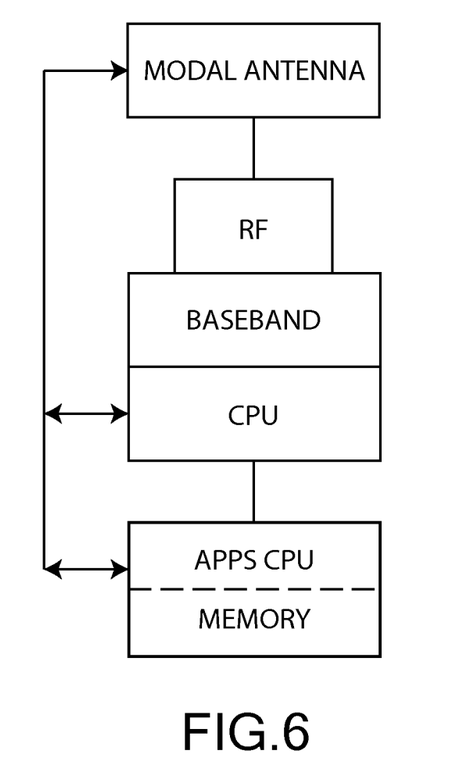
FIG. 6 illustrates a block diagram of an antenna system according to an embodiment.

FIG. 6 illustrates a block diagram of an antenna system, the antenna system comprising a modal antenna, a CPU adapted to configure an optimal antenna mode with the modal antenna according to a baseband signal, the CPU further adapted to send RF signals to the antenna for communicating with the network, and a memory bank connected to an applications CPU for determining modal operation of the antenna about the wireless network.

In practice, certain urban areas can become congested with data traffic about one or more cells within the network, often due to concentrations of high population, and hence a large number of devices being connected to the network. Under certain circumstances, a modal antenna is adapted to navigate communications toward one or more BT's having an optimal budget link.

Figure 7:
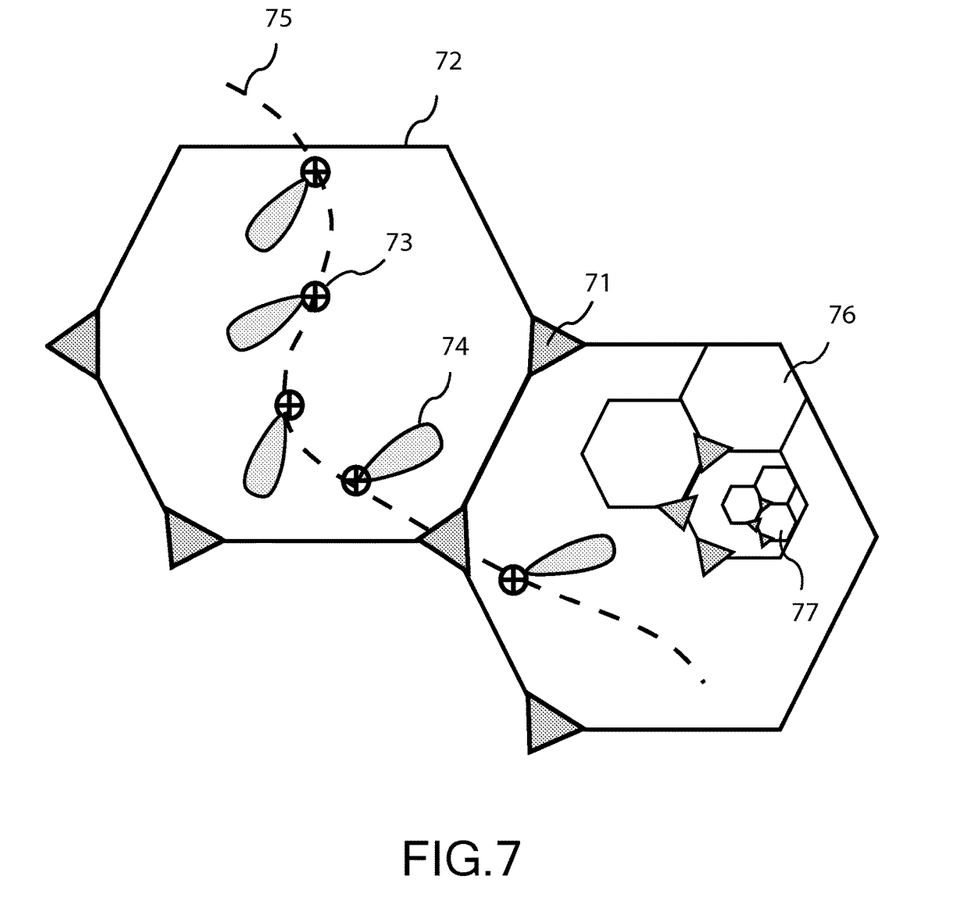
FIG. 7 illustrates the position and antenna mode of a device having a modal antenna system as the device travels across multiple cells, pico cells, and femto cells, along a path of travel within a wireless network.

FIG. 7 illustrates the position and antenna mode of a device having a modal antenna system as the device travels across multiple cells 72, pico cells 76, and femto cells 77, along a path of travel 75 within a wireless network. The device is represented along several waypoints 73, wherein at each waypoint the antenna system is configured with a distinct radiation pattern 74 according to a desired mode. The radiation pattern can be configured for optimal gain/power settings, acceptable level of specific absorption rate (SAR), communication with a specific BT for high-throughput data transfer, or other purpose or combination thereof.

Figure 8:
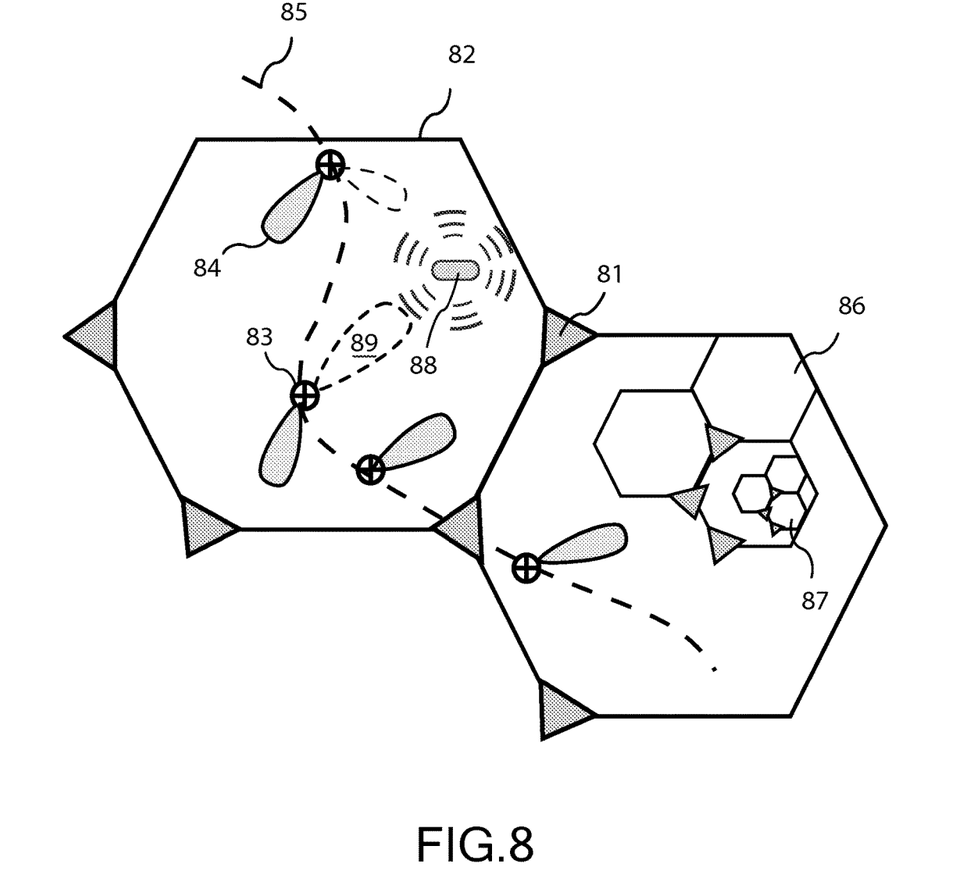
FIG. 8 illustrates the position and antenna mode of a device having a modal antenna system as the device travels across multiple cells, pico cells, and femto cells, along a path of travel within a wireless network.

As depicted in FIG. 8, the antenna system can include a WLAN modal antenna in addition to a cellular modal antenna, thus a first antenna radiation pattern 84 is represented by a solid lobe and a second antenna radiation pattern 89 is represented by a dashed lobe. The first radiation pattern 84 is radiated by the cellular modal antenna, and the second radiation pattern 89 is radiated by the WLAN modal antenna. In FIG. 8, the device having multiple modal antennas is depicted at several waypoints 83, wherein an optimal antenna is selected and configured according to an antenna mode for enhancing communications. As the device nears a WLAN access point 88, the WLAN modal antenna configures an appropriate WLAN antenna mode 89 and data is transmitted with the WLAN access point 88. In this regard, a user may receive email or other downloads via the WLAN. Additionally, the system can determine an upcoming WLAN terminal based on database information and vector predictions, such that the device can predict an upcoming terminal and configure the system for optimized data transfer using a combination of cellular networks, WLAN access points, and other terminals.

Figure 9:
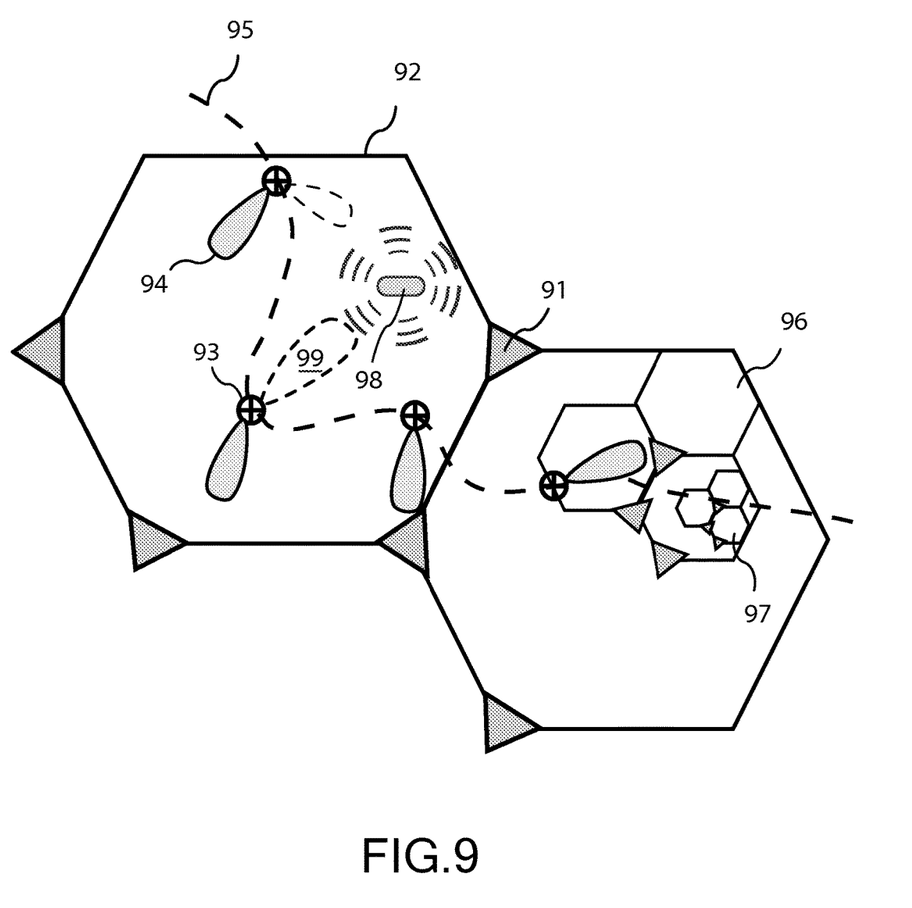
FIG. 9 illustrates a device traveling through various cells within a wireless network, the device being configured for optimum communications across various terminals.

FIG. 9 further illustrates a device traveling through various cells within a wireless network, the device being configured for optimum communications across various terminals. The network includes a number of cells 92, pico cells 96, and femto cells 97 in accordance with population density and resource requirements. The device travels about several waypoints 93, wherein an optimal cellular antenna radiation pattern 94 is represented by a shaded lobe, and an optimal WLAN antenna radiation pattern 99 is represented by a dashed lobe. As the device nears various BT's 91, WLAN access points 98, or other terminals, one or more of the device and/or network is adapted to configure the appropriate antenna mode for communicating with the desired terminal.

Information relating to antenna modes, or network terminal data, can be stored within the device, on a network server, or a combination thereof. In certain embodiments, the network terminals and related communications data can be learned by the device during operation.

Figure 10:
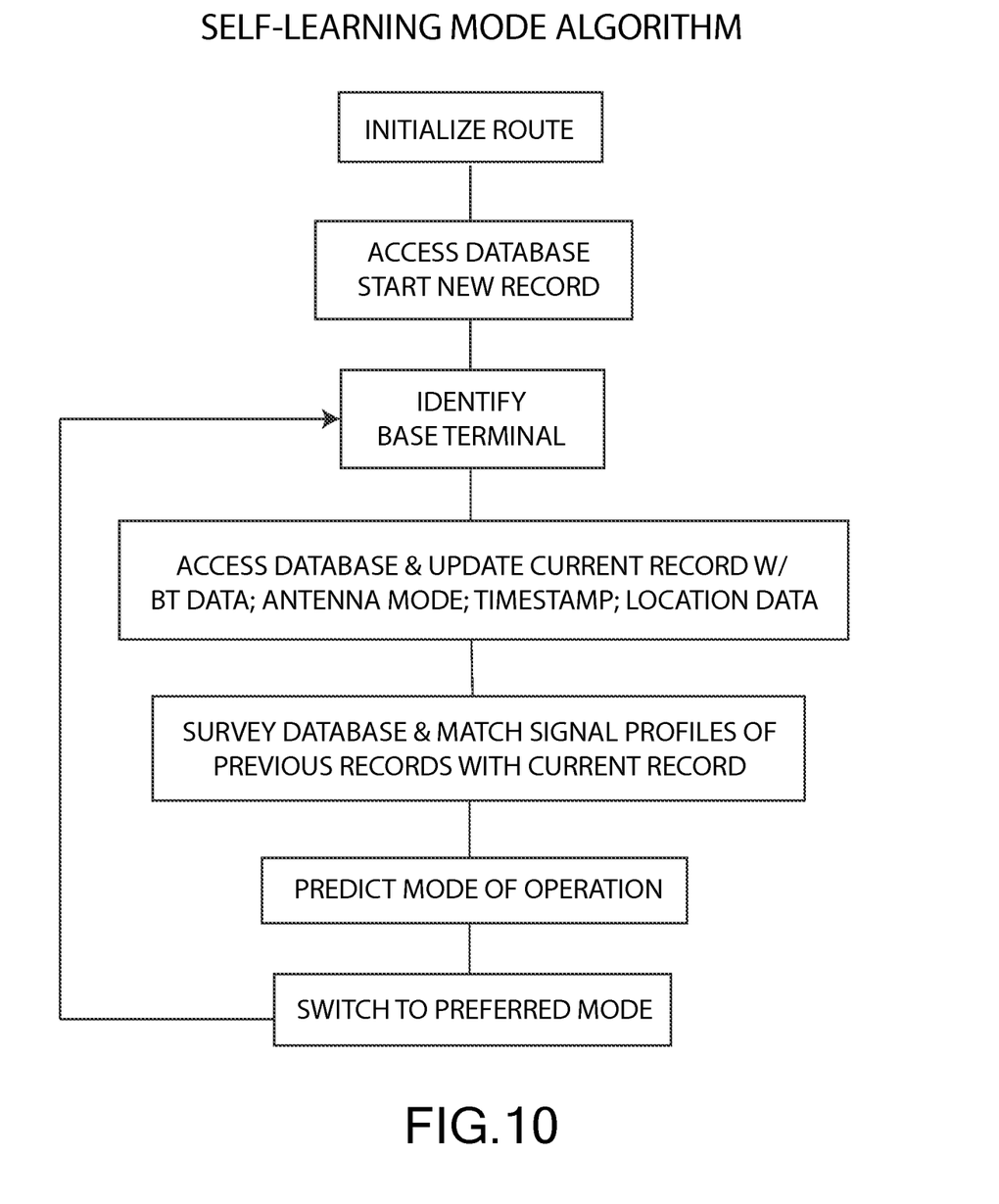
FIG. 10 illustrates an algorithm for acquisition of data which comprises a "Self-Learning Mode".

In one embodiment, the algorithm for acquisition of data comprises a "Self-Learning Mode", wherein a wireless device having an antenna system according to the various embodiments herein is programmed to execute a method as illustrated in FIG. 10, the method comprising: initializing a route; accessing a database and creating a new record; identifying a base terminal; accessing the database and updating the record with one or more of: base station transceiver (BT) data, antenna mode, timestamp, or location data; surveying the database; matching signal profiles of previous records with the present record; predicting an antenna mode for operation; and switching to the preferred antenna mode. The self-learning mode application, without input from the user, senses external signals from cellular, WLAN, GPS, and other communication protocols available and stores profiles in memory for use in predicting antenna mode for communication.

Figure 11:
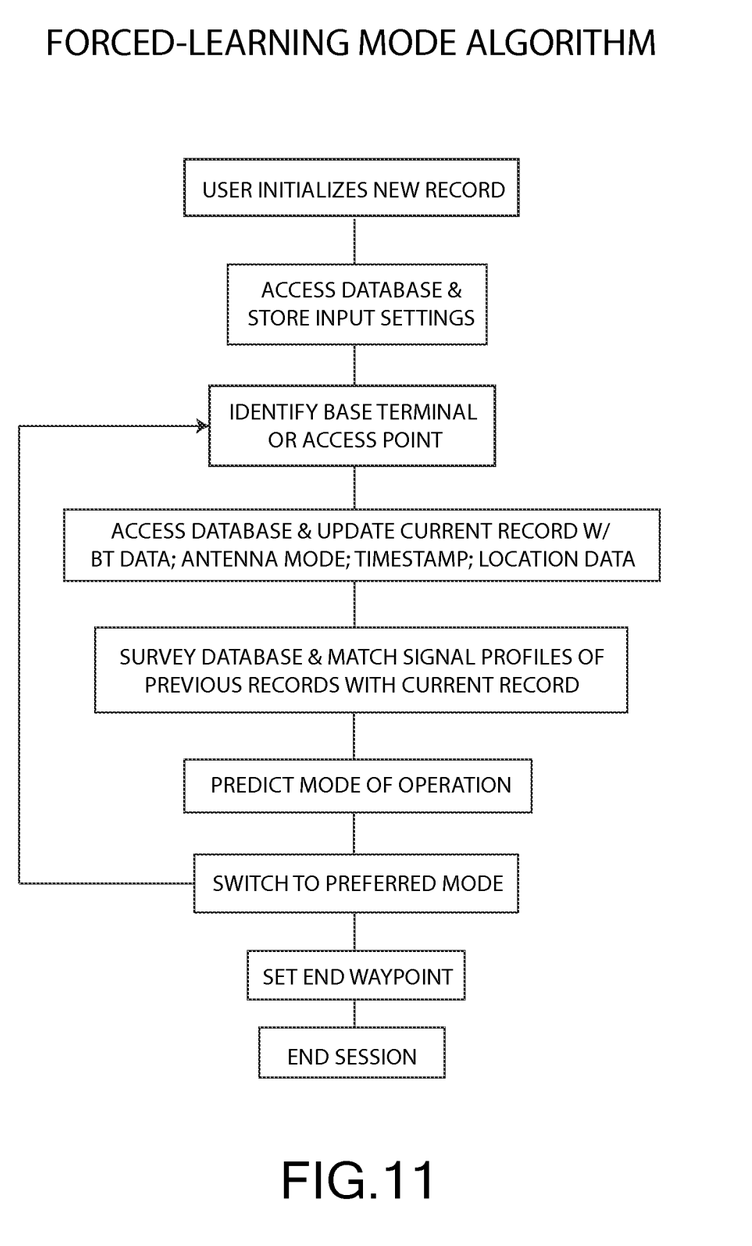
FIG. 11 illustrates an algorithm for acquisition of data which comprises a "Forced-Learning Mode".

In another embodiment, the algorithm for acquisition of data comprises a "Forced-Learning Mode", wherein a wireless device having an antenna system according to the various embodiments herein is programmed to execute a method as illustrated in FIG. 11, the method comprising: initializing a new record per user instructions; accessing the database and storing input settings; identifying a base terminal or access point; accessing the database and updating the new record with one or more of: BT data, antenna mode, timestamp, and location data; surveying the database; matching signal profiles of previous records with the present record; predicting an antenna mode for operation; switching to the preferred antenna mode; setting an end waypoint; and ending the session. The forced-learning mode application takes direction from the user to set up, store, and access signal profiles in memory for use in selecting optimal antenna mode for communication.

In certain embodiments, one or more modal antennas of the device can be used to acquire information from one or more terminals on network, such as terminal identification, terminal location data, and the like. With the acquired network information, the antenna system can look up the database records within the device memory bank and compare the records to the acquired information to determine an approximate location of the device. Based on a return of known network terminals, the device can estimate an approximate location. Additionally, after multiple queries the device can obtain information relating to upcoming terminals and can estimate vector direction in addition to estimated location. With location and vector direction known, the device can estimate upcoming terminals, and can prioritize data transfer accordingly.

In certain other embodiments, an amount of network data is stored on a network server and accessed by a wireless device connected to the network. In this regard, the network can be configured to manage link budget and other network attributes by serving each device connected thereon information related to preferred terminals for connection. Once instructed to connect to a preferred terminal, the device can utilize the memory bank to lookup and configure an antenna mode.

The device can further store information in the memory bank related to data transfer speeds at various terminals. With historical data relating to transfer speeds, the device can be programmed to connect to a network terminal having the highest score or historical rating relating to data transfer speeds. In this regard, the device may be programmed to predict the optimal communications terminal for establishing a connection based on historical data sorted within the memory bank.

In addition to the modal antennas, the antenna system within the device may further comprise one or more passive cellular antennas, passive WLAN antennas, and passive GPS antennas, or any combination thereof.

The invention claimed is:

1. In a wireless device having a modal antenna including a single radiating element and one or more parasitic elements positioned adjacent to the radiating element, a method comprising:
    implementing a self-learning mode, wherein the self-learning mode comprises:
        identifying a first network terminal at a first waypoint;
        determining a first selected antenna mode of a plurality of antenna modes associated with the modal antenna for communicating with the first network terminal at the first waypoint, each of the plurality of antenna modes associated with a different radiation pattern for the modal antenna;
        storing the selected antenna mode as part of a record associated with the first waypoint in one or more memory devices;
        identifying a second network terminal at a second waypoint;
        determining a second selected antenna mode of the plurality of antenna modes associated with the modal antenna for communicating with the second network terminal at the second waypoint, the second selected antenna mode being different from the first selected antenna mode;
        storing the second selected antenna mode as part of a record associated with the second waypoint in one or more memory devices;
    wherein subsequent to implementing the self-learning mode, the method comprises:
    configuring the modal antenna to operate in the first selected antenna mode when proximate the first waypoint using the one or more parasitic elements; and
    configuring the modal antenna to operate in the second selected antenna mode when proximate the second waypoint.

* * * * *